(12) United States Patent
Guionnet et al.

(10) Patent No.: US 7,990,477 B2
(45) Date of Patent: Aug. 2, 2011

(54) METHOD AND DEVICE FOR DETECTING TRANSITIONS IN A VIDEO SEQUENCE, METHOD AND DEVICE FOR CODING, COMPUTER PROGRAM PRODUCTS AND CORRESPONDING STORAGE MEANS

(75) Inventors: Thomas Guionnet, Rennes (FR); Tanguy Person, Rennes (FR); Jean Kypreos, Betton (FR)

(73) Assignee: Envivio France, Chantepie (FR)

( * ) Notice: Subject to any disclaimer, the term of this patent is extended or adjusted under 35 U.S.C. 154(b) by 1338 days.

(21) Appl. No.: 11/542,632

(22) Filed: Oct. 3, 2006

(65) Prior Publication Data

US 2007/0085931 A1    Apr. 19, 2007

(30) Foreign Application Priority Data

Oct. 3, 2005  (FR) ..................... 05 10097

(51) Int. Cl.
*H04N 5/14* (2006.01)
(52) U.S. Cl. ...................................... 348/701
(58) Field of Classification Search .................. None
See application file for complete search history.

(56) References Cited

U.S. PATENT DOCUMENTS

| | | | |
|---|---|---|---|
| 5,592,226 A | 1/1997 | Lee et al. | 348/413 |
| 6,055,025 A | 4/2000 | Shahraray | 348/700 |
| 6,381,278 B1 | 4/2002 | Shin et al. | 375/240.16 |
| 6,493,042 B1 | 12/2002 | Bozdagi et al. | 348/700 |
| 6,721,361 B1 | 4/2004 | Covell et al. | 375/240.14 |
| 7,110,569 B2* | 9/2006 | Brodsky et al. | 382/103 |
| 7,123,769 B2* | 10/2006 | Xiong | 382/199 |
| 2001/0014121 A1 | 8/2001 | Kaye et al. | 375/240.03 |
| 2006/0048191 A1* | 3/2006 | Xiong | 725/52 |

OTHER PUBLICATIONS

H. Yu et al., "Multi-Resolution Video Segmentation Using Wavelet Transformation," Proceedings of the SPIE, The Internat'l Society for Optical Engineering SPIE-Int., XP-002388655, 1997, vol. 3312, pp. 176-187.

T. Volkmer et al., "Gradual Transition Detection Using Average Frame Similarity," Proceedings of the 2004 IEEE Computer Society Conf. on Computer Vision and Pattern Recognition Workshops, XP-010761919, Jun. 2004, pp. 1-9.

(Continued)

*Primary Examiner* — Nhon T Diep (74) *Attorney, Agent, or Firm* — David D. Brush; Westman, Champlin & Kelly, P.A.

(57) ABSTRACT

Method and apparatus for detecting transitions in a video sequence, which include detecting an abrupt transition including, for each image $I_{t-2k}$ included in said video sequence and with a processing time rank t−2k: calculating a first distance $D(I_{t-k})$, between an image $I_{t-k}$ and a reference image for said image $I_{t-k}$, which precedes said image $I_{t-k}$ in the video sequence; calculating a second distance $D(I_{t-2k})$, between an image $I_{t-2k}$ and a reference image for said image $I_{t-2k}$, which precedes said image $I_{t-2k}$ in the video sequence; calculating a third distance $D(I_{t-3k})$, between an image $I_{t-3k}$ and a reference image for said image $I_{t-3k}$, which precedes said image $I_{t-3k}$ in the video sequence; calculating a criterion C' indicating whether said second distance $D(I_{t-2k})$ is significantly greater than the largest of the first and third distances, $D(I_{t-k})$ and $D(I_{t-3k})$; deciding, according to said criterion C', on the belonging of the image $I_{t-2k}$ to an abrupt transition.

17 Claims, 7 Drawing Sheets

OTHER PUBLICATIONS

A. Mittal et al., "Robust Identification of Gradual Shot-Transition Types," Proceedings 2002 Interna'l Conf. on Image Processing., Sep. 2002, vol. 2 of 3, pp. II. 413-416.

R. Lienhart, "Comparison of Automatic Shot Boundary Detection Algorithms," Proc. Image and Video Processing VII 1999, Jan. 1999, pp. 1-12.

J. Bescos et al., "A Unified Model for Techniques on Video-Shot Transition Detection," IEEE Transactions on Multimedia, vol. 7, No. 2, Apr. 2005, pp. 293-307.

J. Boyce, "Weighted Prediction in the H.264/MPEG AVC Video Coding Standard," IEEE, 2004, pp. III-789-III-792.

* cited by examiner

METHOD AND DEVICE FOR DETECTING TRANSITIONS IN A VIDEO SEQUENCE, METHOD AND DEVICE FOR CODING, COMPUTER PROGRAM PRODUCTS AND CORRESPONDING STORAGE MEANS

CROSS-REFERENCE TO RELATED APPLICATION

None.

FIELD OF THE DISCLOSURE

The disclosure falls within the field of video compression.

More specifically, the disclosure relates to a technique for transition detection, as well as a technique for video coding using this transition detection technique.

The disclosure applies in particular, but not exclusively, to the field of video encoders/decoders (codecs) consistent with standard MPEG-4 Advanced Video Coding (also called AVC, H.264 or MPEG-4 part 10).

BACKGROUND OF THE DISCLOSURE

Figure 1:
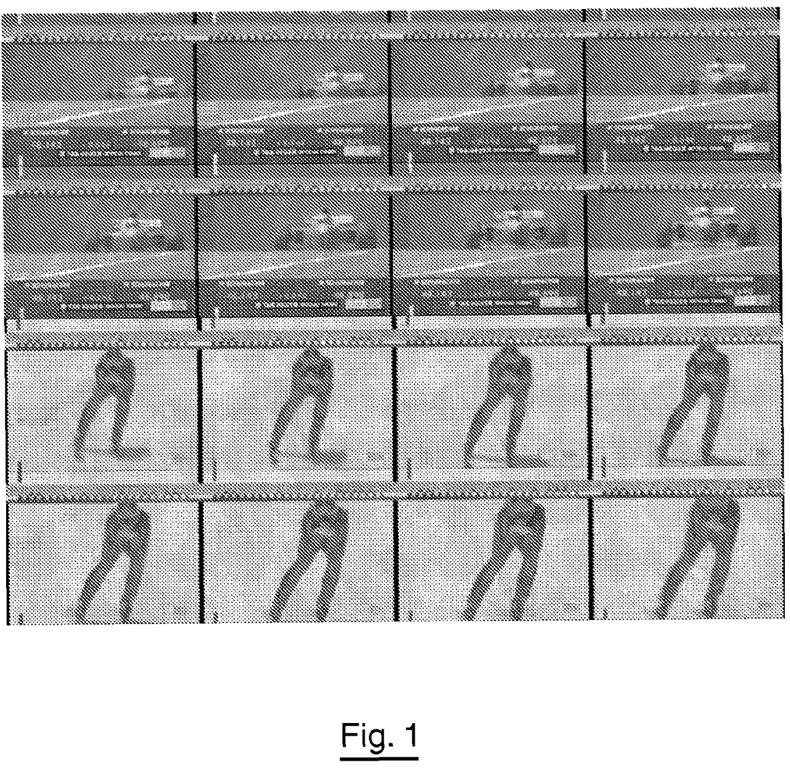
FIG. 1 shows an example of an abrupt transition.
Figure 2:
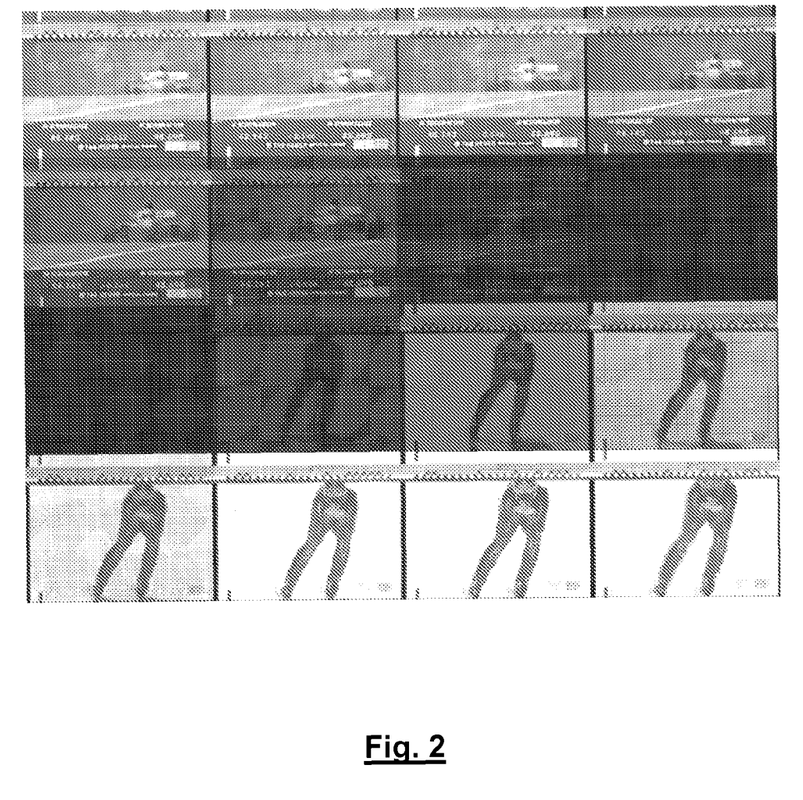
FIG. 2 shows an example of a fade.
Figure 3:
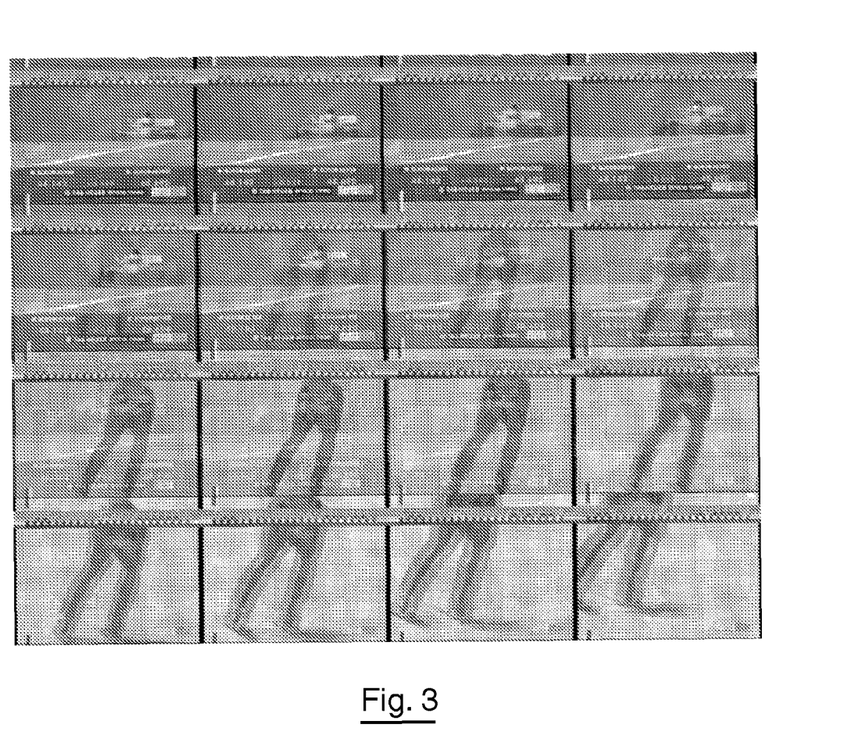
FIG. 3 shows an example of a cross-fade.

In the video field, a scene (also called a shot) can be defined by a set of contiguous consecutive images taken by a single camera and that forms a continuous action in time and space. The passage from one scene to another is called a transition. Video editing tools make it possible to create varied transition effects. The most common are abrupt transitions (see example in FIG. 1), fades (see example in FIG. 2) and cross-fades (see example in FIG. 3). The last two effects are also called gradual transitions. By contrast with the abrupt transition, which links the last image of a shot with the first of the next shot with no particular effect, gradual transitions are progressive and occur over several successive images.

For a video encoder, the transitions can present difficulties. The efficacy in compression of MPEG-type video codecs results from the use of the strong correlation existing between the successive images of the sequences. The transitions significantly reduce, and even eliminate, this correlation. This results in a much higher coding cost. In addition, visually disruptive artefacts can occur. In this context, the automatic identification of transitions makes it possible to parameterise the video encoders so as to maximise the quality/speed ratio.

Numerous transition detection methods have been proposed. Generally, the targeted application is not video coding, but video analysis. One of the most common applications is automatic indexing of video content, which requires, as the preliminary process, the cutting of video sequences into scenes. The following references can be cited:

[1] Lienhart R., "Comparison of Automatic Shot Boundary Detection Algorithms", *Proc. Image and Video Processing VII* 1999, SPIE 3656-29, January 1999.

[2] Bescos J, Cisneros G, Martinez J, Menendez J, Cabrera J, "A Unified Model for Techniques on Video-Shot Transition Detection", IEEE Transactions on Multimedia, Vol. 7, No. 2, April 2005, pp. 293-307.

[3] Covell, et al. "Video processing system including advanced scene break detection methods for fades, dissolves and flashes", patent U.S. Pat. No. 6,721,361 (Apr. 13, 2004).

[4] Bozdagi, et al. "Feature based hierarchical video segmentation", patent U.S. Pat. No. 6,493,042 (Dec. 10, 2002).

[5] Shin, et al. "High accurate and real-time gradual scene change detector and method thereof", patent U.S. Pat. No. 6,381,278 (Apr. 30, 2002).

[6] Shahraray "Method and apparatus for detecting abrupt and gradual scene changes in image sequences", patent U.S. Pat. No. 6,055,025 (Apr. 25, 2000).

The methods cited above all have limitations with respect to the desired application of the present invention, namely video coding. These limitations concern the reliability, complexity or delay of processing. By complexity, we mean the computing cost of the method. The delay is not necessarily associated with the complexity. It represents a latency time between the time at which an image is received and the time at which the method delivers a result concerning this image. The delay is generally dependent on the number of images needed to perform the calculations.

The methods presented in [1] are unreliable. The method presented in [2] is very reliable, but much more complex. The methods presented in [3], [4], [5] and [6] have a more reasonable complexity, but may involve a significant delay. Thus, the delay caused by [3] and [5] is at least equal to the time of the gradual transitions detected. The method presented in [4] functions in two passes (this approach is very common), which is unacceptable for the desired application. Finally, in [6], the efficacy of the method is based on the artificial introduction of a delay. In addition, the use of a time filtering step can also increase this delay.

SUMMARY

An embodiment of the invention relates to a method for detecting transitions in a video sequence, including a step for detecting gradual transitions itself including the following steps, for each image $I_{t-k}$ included in said video sequence and with a processing time rank t−k, with k being a positive integer greater than or equal to one:

calculation of a first distance $C_1$, between said image $I_{t-k}$ and an average image $I_m$, said average image $I_m$ resulting from the calculation of an average between an image $I_t$ and an image $I_{t-2k}$;

calculation of a second distance $C_2$, between said images $I_{t-k}$ and $I_t$, or between said images $I_{t-k}$ and $I_{t-2k}$;

calculation of a criterion C indicating whether said second distance $C_2$ is significantly greater than said first distance $C_1$;

decision, according to said criterion C, on the belonging of image $I_{t-k}$ to a gradual transition.

Thus, this embodiment of the invention is based on an entirely novel and inventive approach to the detection of gradual transitions, based on the use of an original criterion C, calculated from three regularly spaced images $I_t$, $I_{t-k}$ and $I_{t-2k}$. The decision is instantaneous. It is not necessary to wait for the end of the gradual transition to decide whether an image belongs to a gradual transition or not. This embodiment of the invention therefore makes it possible to minimise the processing time, and therefore is compatible with real-time applications. In addition, this embodiment of the invention has low complexity, while providing good reliability.

In a particular embodiment of the invention, said step for detecting gradual transitions also includes a step of calculating a complementary parameter $C_3$, which is a distance between the statistical distributions of light levels $I_{t-k}$ and $I_t$, or between the statistical distributions of light levels of images $I_{t-k}$ and $I_{t-2k}$. In addition, the criterion C indicates whether the result of a weighting of said second distance $C_2$ by said complementary parameter $C_3$ is significantly greater than said first distance $C_1$.

The consideration of the complementary parameter $C_3$ makes it possible to refine the calculation of the criterion C.

Preferably, said decision step uses an automaton with two states, called first and second states, receiving, at the input, the criterion C calculated for the image $I_{t-k}$ and sending, at the output, the value of its new current state, the first and second states (E=0 and E=1) respectively indicating that the image $I_{t-k}$ does not belong or belongs to a gradual transition, said automaton being such that:

- if it is in the first state and receives, at the input, a criterion C below a first threshold Thigh, then its new current state is the first state;
- if it is in the first state and receives, at the input, a criterion C greater than or equal to said first threshold Thigh, then its new current state is the second state;
- if it is in the second state and receives, at the input, a criterion C greater than or equal to a second threshold $T_{low}$, then its new current state is the second state;
- if it is in the second state and receives, at the input, a criterion C below a second threshold $T_{low}$, then its new current state is the first state.

Thus, a double thresholding with hysteresis is performed, which enables a much more reliable decision to be made than with a classic single thresholding.

Advantageously, said step for detecting gradual transitions also includes a step of eliminating a decision of belonging or non-belonging to a gradual transition, including the following steps:

- for each of the images $I_{t-k}$, $I_{t-2k}$ and $I_{t-3k}$, a decision of belonging or non-belonging to a gradual transition is made;
- if the image $I_{t-2k}$ is associated with a decision of belonging to a gradual transition, while the images $I_{t-k}$ and $I_{t-3k}$ are each associated with a decision of non-belonging to a gradual transition, then the image $I_{t-2k}$ is declared as not belonging to a gradual transition;
- if the image $I_{t-2k}$ is associated with a decision of non-belonging to a gradual transition, while the images $I_{t-k}$ and $I_{t-3k}$ are each associated with a decision of belonging to a gradual transition, then the image $I_{t-2k}$ is declared as belonging to a gradual transition.

This post-processing step makes it possible to improve the result of the detection of gradual transitions.

In one particular embodiment, the method for detecting transitions also includes a step of detecting abrupt transitions including the following steps, for each image $I_{t-2k}$ included in said video sequence and with a processing time rank t-2 k:

- calculation of a first distance $D(I_{t-k})$, between an image $I_{t-k}$ and a reference image for said image $I_{t-k}$, which precedes said image $I_{t-k}$ in the video sequence;
- calculation of a second distance $D(I_{t-2k})$, between an image $I_{t-2k}$ and a reference image for said image $I_{t-2k}$, which precedes said image $I_{t-2k}$ in the video sequence;
- calculation of a third distance $D(I_{t-3k})$, between an image $I_{t-3k}$ and a reference image for said image $I_{t-3k}$, which precedes said image $I_{t-3k}$ in the video sequence;
- calculation of a criterion C' indicating whether said second distance $D(I_{t-2k})$ is significantly greater than the largest of the first and third distances, $D(I_{t-k})$ and $D(I_{t-3k})$;
- decision, according to said criterion C', on the belonging of the image $I_{t-2k}$ to an abrupt transition.

For the detection of abrupt transitions, this embodiment of the invention proposes the use of an original criterion C'. This latter is implicitly suitable for video content because it is calculated from three differences between images (also called inter-image differences): one (of which the use is conventional) is an inter-image difference between two successive scenes, the two others (of which the use is original) are inter-image differences inside each of the two aforementioned successive scenes.

This embodiment of the invention allows for a detection of abrupt transitions having the advantages of being relatively simple and reliable, of providing an immediate decision and therefore of allowing for sequential implementation and of involving a short delay.

The method advantageously includes a step of choosing the reference image for each given image, comprising choosing the image that immediately precedes said given image in the video sequence.

According to an advantageous alternative, the method includes a step of choosing the reference image for each given image, including the following steps:

- obtaining an initial list L1 of possible reference images for said given image, said initial list L1 including N images that precede said given image in the video sequence, with $N \geq 2$;
- selection of a reference image among the N possible reference images included in the initial list L1.

Advantageously, said step of selecting a reference image includes the following steps:

- for each of the N reference images, calculation of a distance between the given image and said reference image;
- selection of the reference image of which the distance with respect to the given image is the smallest.

Advantageously, the distance between the given image and said reference image includes a first parameter obtained by a measurement of the distance between the content of the given image and the content of the reference image, or between the content of a reduced version of the current image and the content of a reduced version of the reference image.

In the context of this embodiment of the invention, numerous types of distance calculations between the content of two images can be envisaged, and in particular, but not exclusively the sum of the absolute values of the pixel-to-pixel differences (standard L1), or the sum of the squares of the pixel-to-pixel differences (standard L2).

Advantageously, the distance between the given image and said reference image includes a second parameter proportional to a time distance between the given image and the reference image.

According to an advantageous feature, if two reference images have a same distance with respect to the given image, the reference image closest in time to the given image is considered to have a shorter distance than the other reference image.

Advantageously, the method includes a flash image detection step based on the reference image selected. In addition, said step of deciding, according to said criterion C', on the belonging of the image $I_{t-2k}$ to an abrupt transition includes the following step: if the image $I_{t-2k}$ is declared to be a flash image in said flash image detection step, then the image $I_{t-2k}$ is declared not to be an abrupt transition.

The optional consideration of the presence of flashes makes it possible to improve the reliability of the result.

Advantageously, said step of deciding, according to said criterion C', on the belonging of the image $I_{t-2k}$ to an abrupt transition includes the following step: if the image $I_{t-2k}$ or the image $I_{t-3k}$ is declared to belong to a gradual transition, in said gradual transition detection step, then the image $I_{t-2k}$ is declared not to be an abrupt transition. The optional consideration of the presence of gradual transitions also makes it possible to improve the reliability of the result.

Another embodiment of the invention relates to a method for coding a video sequence, including a phase of detecting transitions in said video sequence.

We thus benefit in the coding method from the advantages of the transition detection technique according to an embodiment of the invention.

Another embodiment of the invention relates to a computer program product downloadable from a communication network and/or recorded on a computer-readable medium and/or executable by a processor, said computer program product including program code instructions for executing the steps of the transition detection method according to the embodiment of the invention, when said program is run on a computer.

Another embodiment of the invention relates to a computer program product downloadable from a communication network and/or recorded on a computer-readable medium and/or executable by a processor, said computer program product including program code instructions for executing the steps of the coding method according to the embodiment of the invention, when said program is run on a computer.

Another embodiment of the invention relates to storage means, which are optionally entirely or partially removable, and computer readable, storing a set of instructions executable by said computer in order to implement the transition detection method according to the embodiment of the invention.

Another embodiment of the invention relates to storage means, which are optionally entirely or partially removable, and computer readable, storing a set of instructions executable by said computer in order to implement the coding method according to the embodiment of the invention.

Another embodiment of the invention relates to a device for detecting transitions in a video sequence, said device including means for detecting gradual transitions including:
- means for calculating a first distance $C_1$, between said image $I_{t-k}$ and an average image $I_m$, said average image $I_m$ resulting from the calculation of an average between an image $I_t$ and an image $I_{t-2k}$, with k being a positive integer greater than or equal to one;
- means for calculating a second distance $C_2$, between said images $I_{t-k}$ and It, or between said images $I_{t-k}$ and $I_{t-2k}$;
- means for calculating a criterion C indicating whether said second distance $C_2$ is significantly greater than said first distance $C_1$;
- means for deciding, according to said criterion C, on the belonging of image $I_{t-k}$ to a gradual transition.

Advantageously, the transition detection device also includes means for detecting abrupt transitions, including:
- means for calculating a first distance $D(I_{t-k})$, between an image $I_{t-k}$ and a reference image for said image $I_{t-k}$, which precedes said image $I_{t-k}$ in the video sequence;
- means for calculating a second distance $D(I_{t-2k})$, between an image $I_{t-2k}$ and a reference image for said image $I_{t-2k}$, which precedes said image $I_{t-2k}$ in the video sequence;
- means for calculating a third distance $D(I_{t-3k})$, between an image $I_{t-3k}$ and a reference image for said image $I_{t-3k}$, which precedes said image $I_{t-3k}$ in the video sequence;
- means for calculating a criterion C' indicating whether said second distance $D(I_{t-2k})$ is significantly greater than the largest of the first and third distances, $D(I_{t-k})$ and $D(I_{t-3k})$;
- means for deciding, according to said criterion C', on the belonging of the image $I_{t-2k}$ to an abrupt transition.

Another embodiment of the invention relates to a coding device of the type including a video encoder and also including a transition detection device according to the embodiment of the invention, said transition detection device cooperating with said video encoder or being at least partially included in said video encoder.

Other features and advantages will become clear from the following description of an embodiment of the invention, given by way of an indicative and non-limiting example, and the appended drawings.

DETAILED DESCRIPTION OF ILLUSTRATIVE EMBODIMENTS

In all of the figures of this document, the same elements are designated by the same numeric reference.

Figure 4:
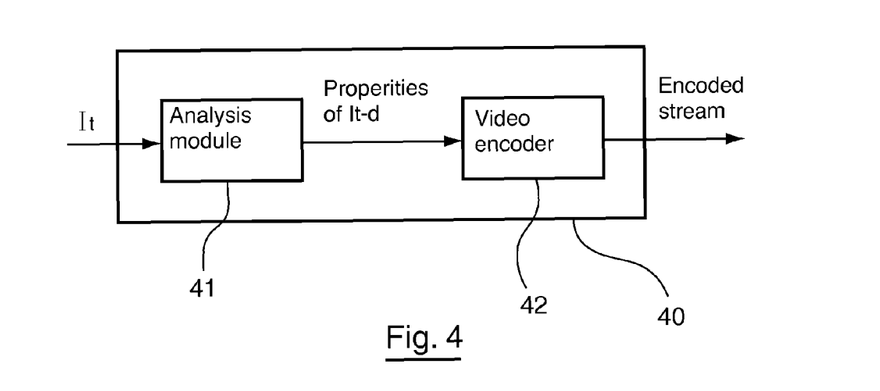
FIGS. 4 and 5 show a functional block diagram of a specific embodiment of a coding device according to a particular embodiment of the invention, including an analysis module downstream of a video encoder.

In the specific embodiment shown in FIG. 4, the coding device according to the embodiment of the invention 40 includes an analysis module 41 downstream of a video encoder 42. It is clear that other embodiments of the invention can be envisaged. It is possible in particular for the analysis module 41 to be at least partially inside the encoder 42.

The analysis module 41 operates sequentially. At each time t, it takes, at the input, an image $I_t$ and sends, at the output, a set of properties concerning an image $I_t$–d preceding $I_t$. This set of properties constitutes the result of the analysis. The value of d characterises the delay caused by the analysis module. The embodiment of the invention has the advantage of minimising the value of this delay.

Figure 5:
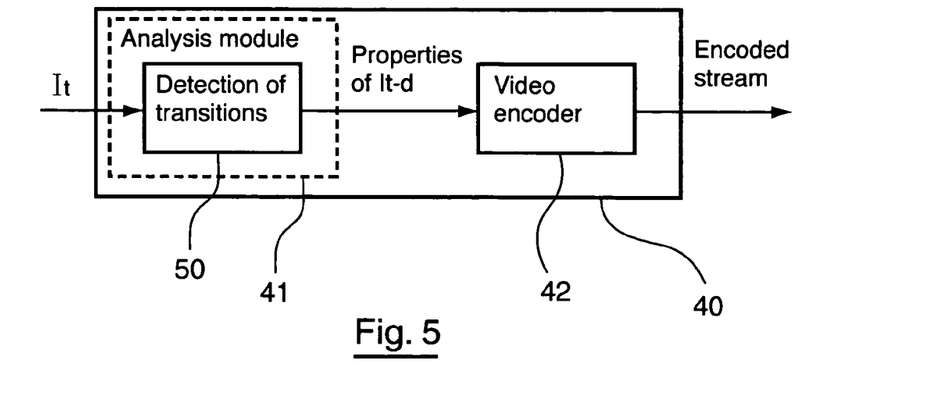

As shown in FIG. 5, the analysis module 41 contains at least one unit (also called a module) for detecting transitions 50. As described in detail below with respect to FIG. 7, the analysis module can contain any other unit promoting the operation of the transition detection unit, such as units for estimating movement, units for estimating light variation, units for calculating inter-image differences and units for temporary storage of images.

Figure 6:
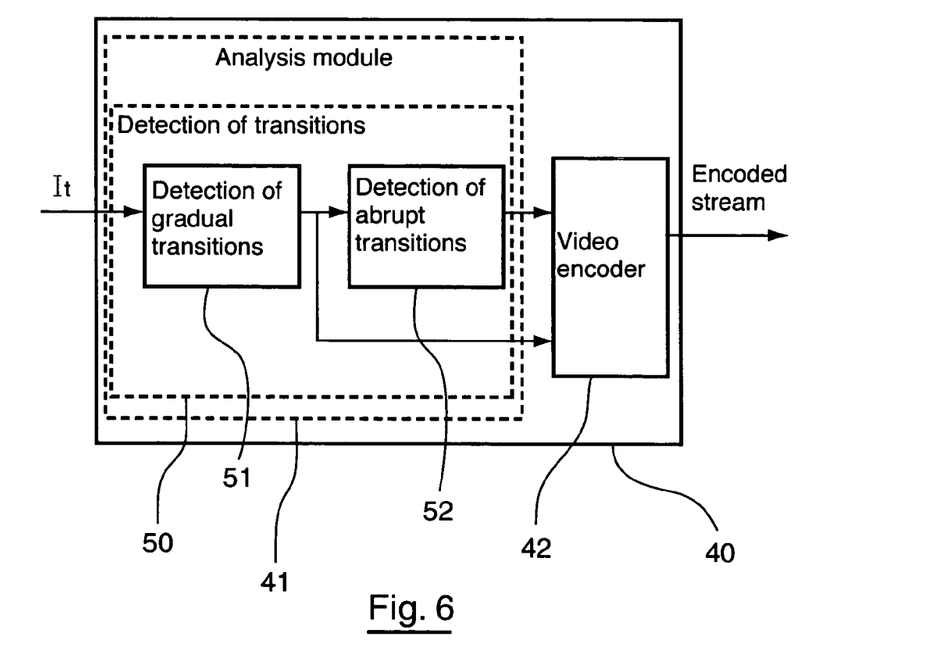
FIG. 6 shows a first specific embodiment of the analysis module shown in FIGS. 4 and 5.

FIG. 6 shows a first specific embodiment of the analysis module 41. It includes a unit 51 for detecting gradual transitions and a unit 52 for detecting abrupt transitions. Thus, the analysis module executes a method for detecting original transitions, making it possible to detect the gradual transitions, the abrupt transitions or both types of transitions simultaneously.

As explained in detail below, in a preferred embodiment of the invention, the detection of gradual transitions is based on the combination of an original criterion C calculated from three successive images and a two-state decision automaton. The decision is instantaneous. It is not necessary to wait for the end of the transition to decide whether an image belongs to a gradual transition or not.

In addition, the detection of abrupt transitions is based on the calculation of an original criterion C', based not only on the properties of the inter-image differences between successive scenes, but also on the properties of the inter-image differences within the same scene. The unit 52 that performs this detection takes into account the result of the detection of gradual transitions if it is available (at the output of the unit 51 performing this other detection).

Figure 7:
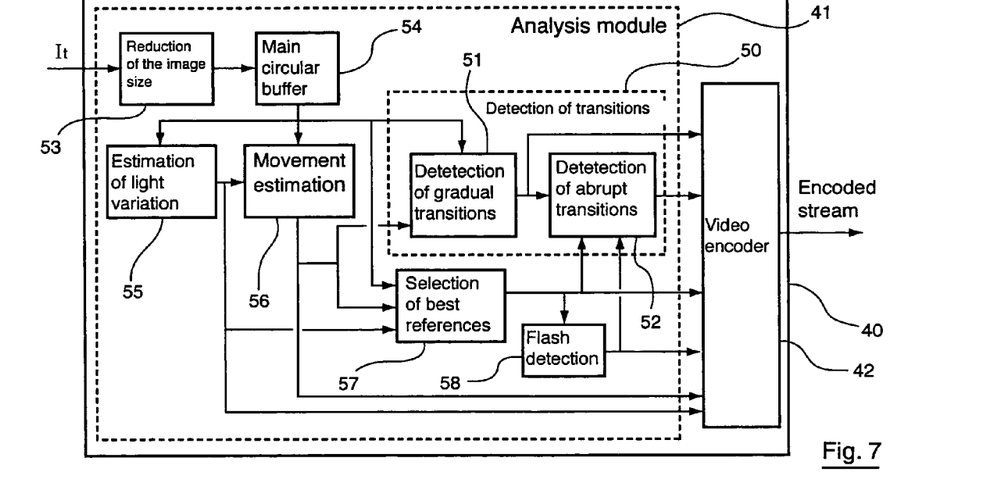
FIG. 7 shows a second specific embodiment of the analysis module shown in FIGS. 4 and 5.

We will now describe, in relation to FIG. 7, a second specific embodiment of the analysis module 41.

The analysis module 41 takes, at the input, at time t, the image $I_t$. It provides, at the output, the following properties concerning the image $I_t$–d:

the nature of the image $I_t$–d, among the following possibilities:
normal;
first image of a new scene (abrupt transition);
image belonging to a gradual transition;
flash;
additional information:
light variation parameters;
movement vector field;
indices of the best references.

The analysis module 41 includes the following units: a unit 53 for reducing the size of the image, a main circular buffer unit 54, a unit 55 for estimating light variation, a unit 56 for estimating movement, a unit 57 for selecting the best references, a unit 58 for detecting flashes and a unit 50 for detecting transitions (as already indicated above, this last one includes a unit 51 for detecting gradual transitions and a unit 52 for detecting abrupt transitions).

We will now describe each of the units of FIG. 7.

1. Reduction of the Image Size

In the unit referenced 53, the image $I_t$ is spatially reduced according to its two dimensions by a given parameter factor. If the reduction factor is equal to 1, the image $I_t$ is not modified. The reduction method is conventional in the field of image processing. It involves an average filtering followed by a sub-sampling.

Input of unit 53: Image $I_t$
Output of unit 53: Reduced image $I'_t$

2. Main Circular Buffer

The unit referenced 54 implements a circular buffer of size d+1, which makes it possible to temporarily store in the memory the last d+1 reduced images calculated. The circular buffer is a conventional method for storing information in computer systems. At time t, the reduced image $I'_t$ replaces the reduced image $I'_{t-d-1}$ in the buffer storage.

Input of unit 54: Reduced image $I'_t$
Output of unit 54: Reduced images $I'_{t-d}$, $I'_{t-d}$+1, ..., $I'_t$.

3. Estimation of Light Variation

The unit referenced 55 calculates the light variation between the reduced images $I'_{t-d-1}$ and $I'_t$. The parameters thus obtained are stored in a circular buffer inside this unit, having a size d+1. An example of the specification of these parameters as well as a calculation method are provided in:

Jill Boyce "WEIGHTED PREDICTION IN THE H.264/ MPEG AVC VIDEO CODING STANDARD" 2004 IEEE International Symposium on Circuits and Systems (ISCAS) Vancouver, British Columbia, Canada, May 23-26, 2004.

Input of unit 55: Reduced images $I'_{t-d-1}$, $I'_t$
Output of unit 55: Parameters of light variations for the images $I'_{t-d}$, $I'_{t-d}$+1, ..., $I'_t$.

4. Estimation of Movement

The unit referenced 56 estimates the movement between the reduced image $I_t$ and the other reduced images available. A compensation for the light variation is made if necessary (use of the output of the unit referenced 55), so as to make the movement estimation more reliable. The movement vector fields thus obtained are stored in a circular buffer inside this unit, having a size d+1. A number of examples of movement estimation methods are provided in "Iain E. G. Richardson "Video codec design", Wiley 2002".

Input of unit 56: Parameters of light variations for the image $I_t$, reduced images $I'_{t-d}$, $I'_{t-d}$+1, ..., $I'_t$.
Output of unit 56: Movement vector fields for the reduced images $I'_{t-d}$, $I'_{t-d+1}$, ..., $I'_t$.

5. Selection of k' Best References

In the unit referenced 57, the indices of the k' best references among N possible references, with k'≧1, are obtained for the image $I_t$. The difference measurement used takes into account, for example, the estimated movement (output of the unit referenced 56) and the estimated light variation (output of the unit referenced 55). The indices of the k' best references for each image $I'_{t-d}$, $I'_{t-d+1}$, ..., $I'_t$ are stored in a circular buffer inside this module, having a size d+1. For each image, the difference value with the best of the k' best references is also saved in the internal circular buffer.

Input of unit 57: Reduced images $I'_{t-d}$, $I'_{t-d+1}$, ..., $I'_t$, movement vector fields for the reduced images $I'_{t-d}$, $I'_{t-d+1}$, ..., $I'_t$, light variation parameters for the image $I_t$.

Output of unit 57: Indices of the k' best references for the images $I'_{t-d}$, $I'_{t-d+1}$, ..., $I'_t$. Values of the difference with the best of the k' best references for the reduced images $I'_{t-d}$, $I'_{t-d+1}$, ..., $I'_t$.

We will now describe a specific embodiment of the unit 57 for selecting the best references. In this example, it is assumed that the coding device according to the embodiment of the invention 40 implements a predictive movement-compensated video coding with multiple references (of type H.264, for example). In one alternative, the encoder does not have multiple references, but the selection of references can still be used to improve the detection of abrupt transitions and for the detection of flashes.

It is noted that, conventionally, to encode the current image $I_t$, a predictive movement-compensated codec with multiple references refers to a list of preceding images L0 (case of an image P) or simultaneously to two lists of images L0 and L1 (case of an image B). The images contained in the lists L0 and L1 are called reference images or simply references. Conventionally, each list of references is always constructed in the same way, regardless of the image of the video sequence forming the current image: this list includes a predetermined number N of consecutive images that precede (in the case of list L0) or follow (in the case of list L1) the current image in the video sequence, with N≧2. Some freedom can be allowed in the choice of this number N.

Below, we will describe, solely by way of example, the selection process in the case of images P, which can be generalised to the case of images B, for which it is simply necessary to repeat the process for the two lists of references.

In the aforementioned context, the unit 57 for selecting the best references makes it possible to obtain a reduced list of references $L_R$, by selecting k' best reference(s) among the N references contained in the initial list L0, with 1≧k'≧N.

For each current image, the process of selecting k' best references is, for example, the following:
  let a measurement $D(I_1, I_2)$ denote the difference between images, such as, for example, the sum of the absolute values of the pixel-to-pixel differences between reduced versions of $I_1$ and $I_2$;
  let I denote the current image;
  let $L0=\{R_1, R_2, \ldots, R_N\}$ denote the list of references;
  for any $n \in \{1, \ldots, N\}$, $D_n = D(I, R_n)$ is calculated;
  let $L_R$ denote the reduced list of references of which the k' indices, with $1 \geq k' \geq N$. are such that for any n belonging to $L_R$, and for any m not belonging to $L_R$, we have: $D_n < D_m$. In other words, $L_R$ is a reduced list containing the k' references the least different from the current image.

For each current image, the reduced list $L_R$ is the result of the process of selecting the best references. This reduced list $L_R$ is transmitted to a unit for estimating movement (not shown in FIG. 7) included in the encoder 42, and which then uses only the k' references thus designated (while a conventional encoder uses the N possible references contained in the initial list L0). This reduced list $L_R$ is also transmitted to the flash detection unit 58.

As indicated above, for each current image, we also determine the best of the k' best references contained in the reduced list $L_R$, and store the difference between this reference and the current image. This difference can thus be provided to the unit 52 for detecting abrupt transitions, which takes it into account in its calculation of the criterion C'.

Optionally, in the specific case in which certain values of D are equal, the time distance with the current image is taken into account. The references closest in time to the current image are considered to have a lower value of D.

Optionally, the distance between two images is corrected by the time distance. We have $D(I_t, I_{t-n}) = D'(I_t, I_{t-n}) + \alpha.n$ with $\alpha$ being a constant set initially (For example 810) and D' being the sum of the absolute values of the pixel-to-pixel differences between reduced versions of $I_t$ and $I_{t-n}$.

These two optional characteristics can be combined or implemented separately.

6. Flash Detection

The unit referenced 58 performs a flash detection. The result obtained for the images $I'_{t-d}, I'_{t-d+1}, \ldots, I'_t$ is saved in a circular buffer inside this module.

It is noted that in a video sequence, a temporary, short event that significantly modifies the content of the video is called a flash (or a flash image). For example, a camera flash triggered during the acquisition will generate a single clearer picture. It is also possible to cite the example of an object that passes in front of the camera.

Input of unit 58: Indices of the best references for the image $I_t$.

Output of unit 58: Indication of flashes among the images $I'_{t-d}, I'_{t-d+1}, \ldots, I'_t$.

We will now describe a specific embodiment of the flash detection unit 58. In this example, it is assumed that the coding device according to the embodiment of the invention 40 implements a predictive movement-compensated video coding with multiple references (of type H.264, for example) and that the unit 57 for selecting the best references provides the flash detection unit 58 with the reduced list $L_R$ of the k' best references (among the N possible references contained in the initial list L0). In an alternative, the encoder does not have multiple references, but the selection of references can still be used to improve the detection of abrupt transitions and for flash detection.

This reduced list $L_R$ is used to perform a flash detection, by applying the following rule:
  let $L_R$ denote the list of k' references least different from the current image;
  let $R_n$ denote the reference belonging to $L_R$ closest in time to the current image;
  let $L_F$ denote the list of images of L0 placed in time between $R_n$ and the current image. The images of $L_F$ are declared to be flashes. If $L_F$ is empty, it means there is no flash.

The result of the flash detection is transmitted to the encoder, which takes this information into account to adjust the quality and the type of the images, and to the unit 52 for detecting abrupt transitions, which takes it into account in order to improve the reliability of the result of this detection.

7. Detection of Gradual Transitions

Figure 8:
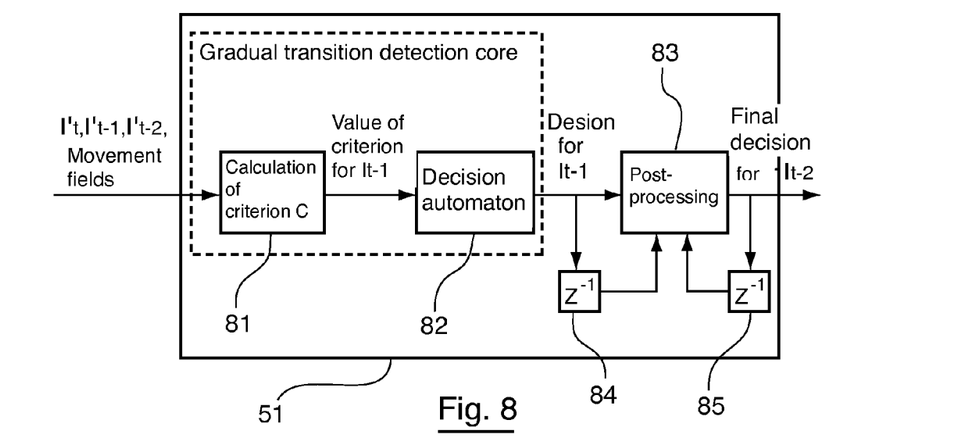
FIG. 8 shows a specific embodiment of the gradual transition detection unit shown in FIG. 7.

We will now describe, in relation to FIG. 8, a specific embodiment of the unit 51 for detecting gradual transitions. This unit has the advantage of being relatively simple and reliable, of providing an immediate decision and therefore of allowing for sequential implementation and of involving a short delay. These advantages are obtained by the combination of a unit 81 for calculating an original criterion C with a two-state decision automaton 82. An optional post-processing unit 83 makes it possible to improve the reliability of the result.

Input of unit 51: Reduced images $I'_{t-d}, I'_{t-d+1}, \ldots, I'_t$, movement vector fields for the reduced images $I'_{t-d}, I'_{t-d+1}, \ldots, I'_t$.

Output of unit 51: Indication of belonging to a gradual transition for the image $I_{t-d}$.

The unit 81 for calculating the criterion C executes the next process, for each image $I_{t-d}$ included in the video sequence and with a processing time rank t−k, with k being a positive integer greater than or equal to one:
  calculation of a first distance $C_1$, between said image $I_{t-k}$ and an average image $I_m$, said average image $I_m$ resulting from the calculation of an average between an image $I_t$ and an image $I_{t-2k}$;
  calculation of a second distance $C_2$, between the images $I_{t-k}$ and $I_t$, or between the images $I_{t-k}$ and $I_{t-2k}$ (as explained below, either only the distance between the images $I_{t-k}$ and $I_t$ is calculated, or only the distance between the images $I_{t-k}$ and $I_{t-2k}$ is calculated, or both distances are calculated and the smaller distance is used);
  calculation of a criterion C indicating whether the second distance $C_2$ is significantly greater than the first distance $C_1$. Indeed, in gradual transitions, the prediction to which the first distance $C_1$ corresponds is good, whereas that to which the second distance corresponds is poor. In other words, if the image $I_{t-k}$ belongs to a gradual transition, $C_1$ remains small while $C_2$ becomes large;
  decision, according to the criterion C, on the belonging of image $I_{t-k}$ to a gradual transition.

For example, it is assumed below that: k=1. We are therefore working with the images $I_t$, $I_{t-1}$ and $I_{t-2}$.

If the vector fields have not been calculated, the first distance $C_1$ can be mathematically expressed in various ways, for example by one of the following two equations:

$$C_1 = \sum_x \sum_y \left( I'(x, y, t-1) - \frac{I'(x, y, t-2) + I'(x, y, t)}{2} \right)^2$$

-continued $$C_1 = \sum_x \sum_y \left| I'(x, y, t-1) - \frac{I'(x, y, t-2) + I'(x, y, t)}{2} \right|$$

with I'(x, y, t) being the light of the pixel at the spatial position (x, y) in a reduced image I'$_t$ obtained from the image I$_t$, I'(x, y, t−1) being the light of the pixel at the spatial position (x, y) in a reduced image I'$_{t-d-1}$ obtained from the image I$_{t-1}$, and I'(x, y, t−2) being the light of the pixel at the spatial position (x, y) in a reduced image I'$_{t-2}$ obtained from the image I$_{t-2}$.

If the vector fields have been calculated, the first distance $C_1$ can be mathematically expressed in various ways, for example by one of the following two equations:

$$C_1 = \sum_x \sum_y \left( I'(x, y, t-1) - \frac{\hat{I}'(x, y, t-2) + \hat{I}'(x, y, t)}{2} \right)^2$$

$$C_1 = \sum_x \sum_y \left| I'(x, y, t-1) - \frac{\hat{I}'(x, y, t-2) + \hat{I}'(x, y, t)}{2} \right|$$

with Î'(x, y, t−2) being the light of the pixel at the spatial position (x, y) in a movement-compensated reduced image Î'$_{t-2}$, which is a reduced version, and compensated according to a movement vector field estimated between the images I$_{t-1}$ and I$_{t-2}$, of the image I$_{t-2}$, and Î(x, y, t) being the light of the pixel at the spatial position (x, y) in a movement-compensated reduced image Î'$_t$, which is a reduced version, and compensated according to a movement vector field estimated between the images I$_{t-1}$ and I$_t$, of the image I$_t$.

If the vector fields have not been calculated, the second distance $C_2$ can be mathematically expressed in various ways, for example by one of the following two equations:

$$C_2 = \min\left( \sum_x \sum_y (I'(x, y, t-1) - I'(x, y, y-2))^2, \sum_x \sum_y (I'(x, y, t-1) - I'(x, y, t))^2 \right)$$

$$C_2 = \min\left( \sum_x \sum_y |I'(x, y, t-1) - I'(x, y, t-2)|, \sum_x \sum_y |I'(x, y, t-1) - I'(x, y, t)| \right)$$

If the vector fields have been calculated, the second distance $C_2$ can be mathematically expressed in various ways, for example by one of the following equations:

$$C_2 = \sum_x \sum_y \left( I'(x, y, t-1) - \hat{I}'(x, y, t-2) \right)^2$$

$$C_2 = \sum_x \sum_y \left| I'(x, y, t-1) - \hat{I}'(x, y, t-2) \right|$$

$$C_2 = \sum_x \sum_y \left( I'(x, y, t-1) - \hat{I}'(x, y, t) \right)^2$$

$$C_2 = \sum_x \sum_y \left| I'(x, y, t-1) - \hat{I}'(x, y, t) \right|$$

with Î'(x, y, t−2) being the light of the pixel at the spatial position (x, y) in a movement-compensated reduced image Î'$_{t-2}$, which is a reduced version, and compensated according to a movement vector field estimated between the images I$_{t-1}$ and I$_{t-2}$, of the image I$_{t-2}$, and Î(x, y, t) being the light of the pixel at the spatial position (x, y) in a movement-compensated reduced image Î'$_t$, which is a reduced version, and compensated according to a movement vector field estimated between the images I$_{t-1}$ and I$_t$, of the image I$_t$.

The criterion C can be mathematically expressed in various ways, for example by one of the following two equations:

$$C = \frac{C_2}{C_2 + \varepsilon'}$$
$$C = C_2 - C_1$$

with ε being a predetermined small positive value.

In an alternative embodiment the process of calculating the criterion C also includes a step of calculating a complementary parameter $C_3$, which is a distance between the statistical distributions of the light levels of images I$_{t-k}$ and I$_t$, or between the statistical distributions of the light levels of images I$_{t-k}$ and I$_{t-2k}$. The complementary parameter $C_3$ takes a high value in the gradual transitions. In this alternative, the criterion C indicates whether the result of a weighting of the second distance $C_2$ by the complementary parameter $C_3$ is significantly greater than the first distance $C_1$.

Also by way of example, it is assumed below that: k=1.

The complementary parameter $C_3$ can be mathematically expressed in various ways, for example by one of the following two equations:

$$C_3 = \sum_{n=1}^{N} |H(t-1, n) - H(t-2, n)|$$

$$C_3 = \sum_{n=1}^{N} (H(t-1, n) - H(t-2, n))^2$$

$$C_3 = \sum_{n=1}^{N} |H(t-1, n) - H(t, n)|$$

$$C_3 = \sum_{n=1}^{N} (H(t-1, n) - H(t, n))^2$$

with H(t), H(t−1) and H(t−2) being the histograms quantified on N reduced version levels I'(t), I'(t−1) and I'(t−2) of the images I$_t$, I$_{t-1}$ and I$_{t-2}$.

In the case of the aforementioned alternative, the criterion C can be mathematically expressed in various ways, for example by one of the following two equations:

$$C = \frac{C_2 \cdot C_3}{C_1 + \varepsilon}$$
$$C = (C_2 + \alpha \cdot C_3) - C_1,$$

with ε being a predetermined small positive value and α being a predetermined constant.

It should be noted that all of the operations of the unit 81 for calculating the criterion C can be applied indifferently to images in grey levels or to colour components. The application to all image components is done by a simple summation (possibly weighted) of three measurements on each of the components.

Figure 9:
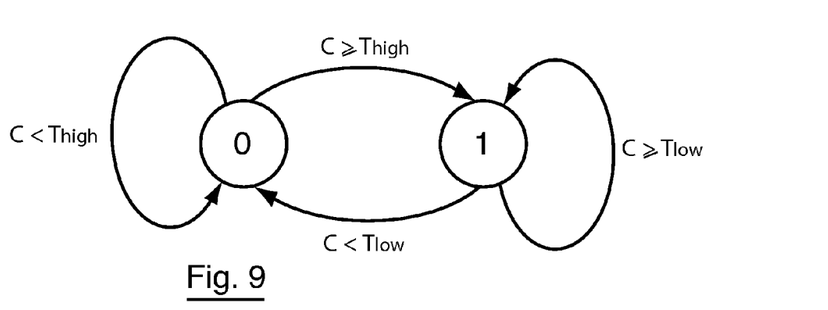
FIG. 9 shows a specific embodiment of the two-state decision automaton shown in FIG. 8.

We will now present, in relation to FIG. 9, a specific embodiment of the two-state decision automaton 82. It takes, at the input, the value of the criterion C corresponding to the image $I_{t-1}$. It sends, at the output, the value of its current state E. If E=1, then $I_{t-1}$ belongs to a gradual transition; otherwise, $I_{t-1}$ does not belong to a gradual transition. The two thresholds $T_{low}$ and $T_{high}$ are set beforehand. It is preferable for $T_{high} > T_{low}$. This method is much more reliable than conventional thresholding. The decision automaton 82 is such that:

- if it is in the state E=0 and receives at the input a criterion C below the threshold $T_{high}$, then its new current state is E=0;
- if it is in the state E=0 and receives at the input a criterion C greater than or equal to the threshold $T_{high}$, then its new current state is E=1;
- if it is in the state E=1 and receives at the input a criterion C greater than or equal to the threshold $T_{low}$, then its new current state is E=1;
- if it is in the state E=1 and receives at the input a criterion C below the threshold $T_{low}$, then its new current state is E=0.

The post-processing unit 83 (optional) makes it possible to eliminate the isolated detections or non-detections of gradual transitions. Owing to the delay operators denoted $Z^{-1}$ and referenced 84 and 85 in FIG. 8, the post-processing unit 83 has information of belonging to a gradual transition for images $I_{t-1}$, $I_{t-2}$, $I_{t-3}$ (we are still assuming, by way of example, that k=1). If $I_{t-2}$ belongs to a gradual transition but not $I_{t-1}$ or $I_{t-3}$, then $I_{t-2}$ is declared not to belong to a gradual transition. If $I_{t-1}$ and $I_{t-3}$ belong to a gradual transition but not $I_{t-2}$, then $I_{t-2}$ is declared to belong to a gradual transition. In all other cases, no modification is made.

8. Detection of Abrupt Transitions

The unit 52 for detecting abrupt transitions has the advantages of being relatively simple and reliable, of providing an immediate decision and therefore of allowing for sequential implementation and of involving a short delay. These advantages are obtained by the introduction of a new criterion calculation (criterion C') implicitly suitable for video content. The optional consideration of the presence of flashes or gradual transitions makes it possible to improve the reliability of the result.

Input of unit 52: Indication of belonging to a gradual transition for the image $I_{t-d}$, difference with the best of the k' best references for the reduced images $I'_{t-d}$, $I'_{t-d+1}$, ..., $I'_t$, indication of flashes among the images $I'_{t-d}$, $I'_{t-d+1}$, ..., $I'_t$.

Output of unit 52: Indication of an abrupt transition for the image $I_{t-d}$.

Figure 10:
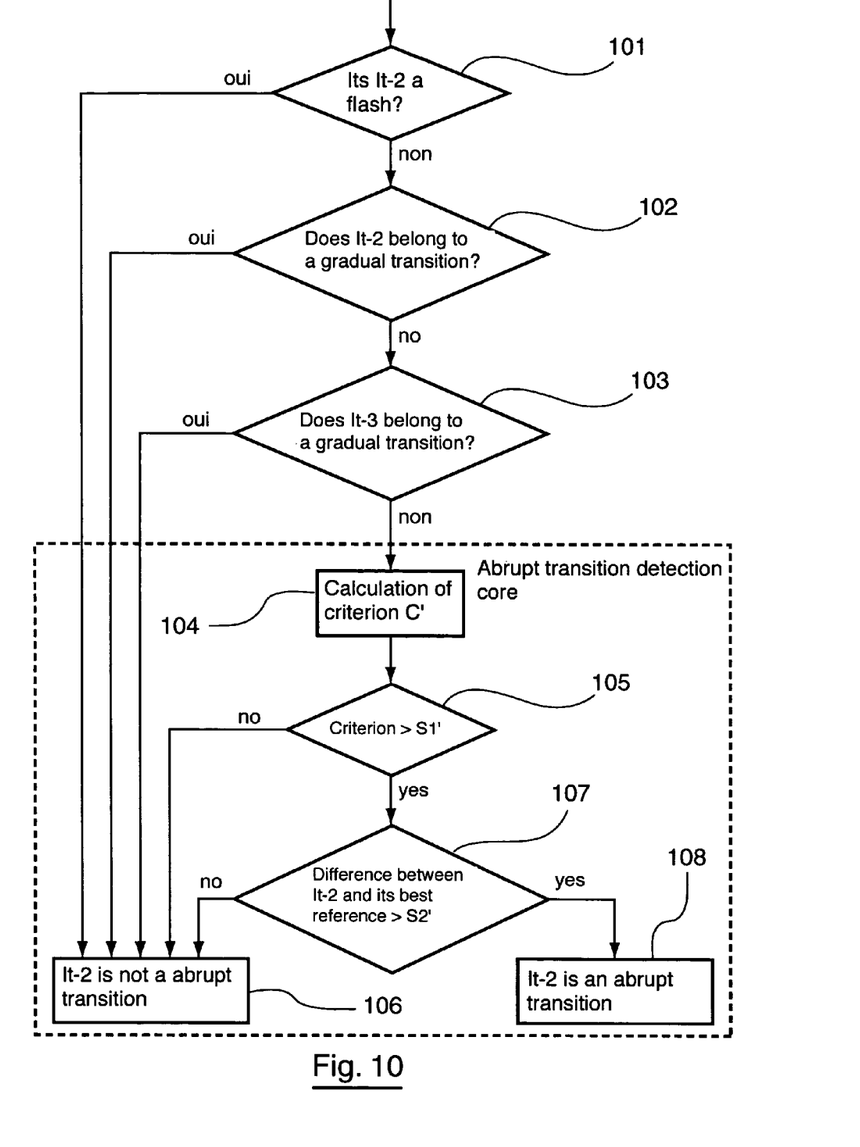
FIG. 10 shows an organisation chart showing an example of the operation of the unit for detecting abrupt transitions shown in FIG. 7.

We will now discuss, in relation to the organisation chart of FIG. 10, an example of a process executed by the unit 52 for detecting abrupt transitions. This process is executed for each image $I_{t-2k}$ and takes into account the images $I_{t-k}$, $I_{t-2k}$ and $I_{t-3k}$.

Again, by way of example, it is assumed in the description below that: k=1 (therefore, we are referring to images $I_{t-1}$, $I_{t-2}$ and $I_{t-3}$).

In a step referenced 101, it is detected whether the image $I_{t-2}$ has been declared to be a flash by the flash detection unit 58. In the case of a positive detection, we proceed to the step referenced 106, in which the image $I_{t-2}$ is declared not to be an abrupt transition.

If the image $I_{t-2}$ has not been declared to be a flash, we proceed to the step referenced 102, in which it is detected whether the image $I_{t-2}$ has been declared to belong to a gradual transition by the unit 51 for detecting gradual transitions. In the case of a positive detection, we proceed to the step referenced 106, in which the image $I_{t-2k}$ is declared not to be an abrupt transition.

If the image $I_{t-2}$ has not been declared to belong to a gradual transition, we proceed to the step referenced 103, in which it is detected whether the image $I_{t-3}$ has been declared to belong to a gradual transition by the unit 51 for detecting gradual transitions. In the case of a positive detection, we proceed to the step referenced 106, in which the image $I_{t-2}$ is declared not to be an abrupt transition.

If the image $I_{t-3}$ has not been declared to belong to a gradual transition, we proceed to the step referenced 104, in which a criterion C' is calculated for the image $I_{t-2}$. This step 104 is described in detail below.

Then, in a step referenced 105, it is detected whether the criterion C' is greater than a first threshold S1'. In the case of a negative detection, we proceed to the step referenced 106, in which the image $I_{t-2}$ is declared not to be an abrupt transition.

If the criterion C' is greater than the first threshold S1', we proceed to the step referenced 107, in which it is detected whether a second distance $D(I_{t-2k})$ (discussed in detail below, and which is a distance between the image $I_{t-2}$ and the best of its k' reference images) is greater than a second threshold S2'. In the case of a negative detection, we proceed to the step referenced 106, in which the image $I_{t-2}$ is declared not to be an abrupt transition. In the case of a positive detection, we proceed to the step referenced 108, in which the image $I_{t-2}$ is declared to be an abrupt transition.

In an alternative embodiment, the step referenced 107 is omitted and the decision is therefore based on a simple thresholding.

We now return in detail to the step 104 of calculating the criterion C', which constitutes the key step of the method for detecting abrupt transitions. Indeed, the conventional methods for detecting abrupt transitions are based on a calculation of the difference between successive images. A significant difference between two images indicates a change in scene. However, these methods have a limited reliability. Indeed, many events can cause significant differences between images, resulting in many false detections. It is also difficult to set an appropriate threshold. This latter is dependent on video sequences.

The originality of this approach lies in the fact of considering three inter-image differences: one is an inter-image difference between two successive scenes; the two others are inter-image differences within each of these two successive scenes.

The step 104 of calculating the criterion C' itself includes the following steps, for each image $I_{t-2}$ included in the video sequence (it is assumed again that k=1, by way of example):

- calculation of a first distance $D(I_{t-1})$, between the image $I_{t-k}$ and the best of its k' reference images;
- calculation of a second distance $D(I_{t-2})$, between the image $I_{t-2}$ and the best of its k' reference images;
- calculation of a third distance $D(I_{t-3})$, between the image $I_{t-3}$ and the best of its k' reference images;
- calculation of the criterion C' indicating whether said second distance $D(I_{t-2})$ is significantly greater than the largest of the first and third distances, $D(I_{t-1})$ and $D(I_{t-3})$.

The first, second and third distances are preferably the differences between images already calculated by the unit 57 for selecting the best references (see discussion above).

Figure 11:
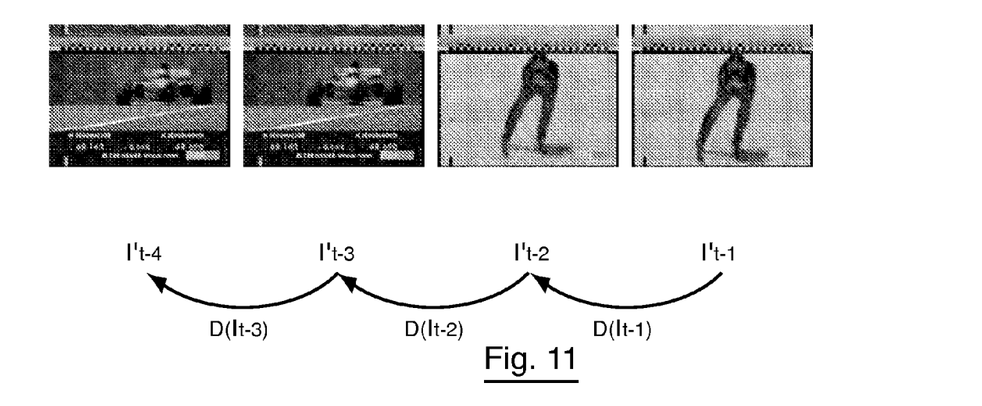
FIG. 11 shows, with an example, the principle of the detection of abrupt transitions according to a particular embodiment of the invention.

In an alternative embodiment of the invention (if no information is available on the best of the k' reference images, for each image), the reference image for a given image is the one that immediately precedes it in the video sequence. In this case, as shown in FIG. 11, the criterion C' is calculated from:
the difference $D(I_{t-1})$ between the first two images of the scene that is beginning,
the difference $D(I_{t-2})$ between the last image of one scene and the first image of the following scene, and
the difference $D(I_{t-3})$ between the last two images of the scene that is ending.

In this example, it is expected that $D(I_{t-2})$ will be clearly greater than $D(I_{t-1})$ and $D(I_{t-3})$.

The criterion C' can be mathematically expressed in various ways, for example by one of the following two equations:

$$C' = \frac{D(I_{t-2k})}{\max(D(I_{t-k}), D(I_{t-3k})) + \varepsilon},$$

with $\varepsilon$ being a predetermined small positive value; C2-K2

$$C'=D(I_{t-2k})-(\max(D(I_{t-k}), D(T_{t-3k})))$$

9. General Remarks

It is noted that an embodiment of the invention is not limited solely to a hardware implementation, but that it can also be implemented in the form of a sequence of instructions of a computer program or any other form combining a hardware portion and a software portion. If an embodiment of the invention is implemented partially or entirely in software form, its corresponding instruction sequence can be stored in removable storage means (such as, for example, a diskette, a CD-ROM or a DVD-ROM) or not, these storage means being partially or entirely readable by a computer or a microprocessor.

It is clear that many other embodiments of the invention can be envisaged. It is possible in particular to consider implementing only the detection of gradual transitions or only the detection of abrupt transitions.

An embodiment provides a technique for detecting transitions that is reliable, fast and with a short delay, and therefore suitable for the problem of video coding, in particular in real-time applications with a time limit.

An embodiment provides such a technique for detecting transitions that is easy to implement and inexpensive.

Although the present invention has been described with reference to various embodiments, workers skilled in the art will recognize that changes may be made in form and detail without departing from the spirit and scope of the invention.

What is claimed is:

1. A method for detecting transitions in a video sequence, the method comprising detecting an abrupt transition including the following steps, for each image $I_{t-2k}$ included in said video sequence and with a processing time rank t−2k:
calculation of a first distance $D(I_{t-k})$, between an image $I_{t-k}$ and a reference image for said image $I_{t-k}$, which precedes said image $I_{t-k}$ in the video sequence;
calculation of a second distance $D(I_{t-2k})$, between an image $I_{t-2k}$ and a reference image for said image $I_{t-2k}$, which precedes said image $I_{t-2k}$ in the video sequence;
calculation of a third distance $D(I_{t-3k})$, between an image $I_{t-3k}$ and a reference image for said image $I_{t-3k}$, which precedes said image $I_{t-3k}$ in the video sequence;
calculation of a criterion C' indicating whether said second distance $D(I_{t-2k})$ is significantly greater than the largest of the first and third distances, $D(I_{t-k})$ and $D(I_{t-3k})$;
decision, according to said criterion C', on the belonging of the image $I_{t-2k}$ to an abrupt transition.

2. The method according to claim 1, and further comprising choosing the reference image for each given image, comprising choosing the image that immediately precedes said given image in the video sequence.

3. The method according to claim 1, and further comprising choosing the reference image for each given image, including the following steps:
obtaining an initial list L1 of possible reference images for said given image, said initial list L1 including N images that precede said given image in the video sequence, with N≧2; and
selection of a reference image among the N possible reference images included in the initial list LI.

4. The method according to claim 3, characterised in that said step of selecting a reference image includes the following steps:
for each of the N reference images, calculation of a distance between the given image and said reference image;
selection of the reference image of which the distance with respect to the given image is the smallest.

5. The method according to claim 4, wherein the distance between the given image and said reference image includes a first parameter obtained by a measurement of the distance between the content of the given image and the content of the reference image, or between the content of a reduced version of the current image and the content of a reduced version of the reference image.

6. The method according to claim 5, wherein the distance between the given image and said reference image includes a second parameter proportional to a time distance between the given image and the reference image.

7. The method according to claim 1, wherein, if two reference images have a same distance with respect to the given image, the reference image closest in time to the given image is considered to have a shorter distance than the other reference image.

8. The method according to claim 1, wherein said criterion C' is mathematically expressed by an equation belonging to the group including:

$$C' = \frac{D(I_{t-2k})}{\max(D(I_{t-k}), D(I_{t-3k})) + \varepsilon}$$

$$C' = D(I_{t-2k}) - (\max(D(I_{t-k}), D(I_{t-3k})))$$

with $\varepsilon$ being a predetermined small positive value.

9. The method according to claim 1, characterised in that said decision step includes the following steps:
comparison of said criterion C' with a first threshold S1';
if said criterion C' is less than or equal to the first threshold S1', then the image $I_{t-2k}$ is declared not to be an abrupt transition;
if said criterion C' is greater than the first threshold S1', comparison of said second distance $D(I_{t-2k})$, between the image $I_{t-2k}$ and its reference image, with a second threshold S2';
if said second distance $D(I_{t-2k})$ is less than or equal to the second threshold S2', then the image $I_{t-2k}$ is declared not to be an abrupt transition; and
if said second distance $D(I_{t-2k})$ is greater than the second threshold S2', then the image $I_{t-2k}$ is declared to be an abrupt transition.

10. The method according to claim 3, and further comprising detecting a flash image detection based on the reference image selected, and wherein said decision, according to said criterion C', on the belonging of the image $I_{t-2k}$ to an abrupt transition includes the following step:

if the image $I_{t-2k}$ is declared to be a flash image in said flash image detection step, then the image $I_{t-2k}$ is declared not to be an abrupt transition.

11. The method according to claim 10, wherein detecting said flash image includes determining a list LF of at least one flash image, capable of being empty and including any reference image from the initial list LI, which is placed in time between the given image and said reference image selected.

12. The method according to claim 1, wherein said decision, according to said criterion C', on the belonging of the image $I_{t-2k}$ to an abrupt transition includes the following step:

if the image $I_{t-2k}$ or the image $I_{t-3k}$ is declared to belong to a gradual transition, in said gradual transition detection step, then the image $I_{t-2k}$ is declared not to be an abrupt transition.

13. A method comprising coding a video sequence, which includes a phase of detecting transitions in said video sequence according to the method of claim 1.

14. A storage device, which is computer readable, wherein the storage device comprises a set of stored instructions executable by a computer in order to detect an abrupt transition including the following steps, for each image $I_{t-2k}$ included in a video sequence and with a processing time rank t−2k:

calculating a first distance $D(I_{t-k})$, between an image $I_{t-k}$ and a reference image for said image $I_{t-k}$, which precedes said image $I_{t-k}$ in the video sequence;

calculating a second distance $D(I_{t-2k})$, between an image $I_{t-2k}$ and a reference image for said image $I_{t-2k}$, which precedes said image $I_{t-2k}$ in the video sequence;

calculating a third distance $D(I_{t-3k})$, between an image $I_{t-3k}$ and a reference image for said image $I_{t-3k}$, which precedes said image $I_{t-3k}$ in the video sequence;

calculating a criterion C' indicating whether said second distance $D(I_{t-2k})$ is significantly greater than the largest of the first and third distances, $D(I_{t-k})$ and $D(I_{t-3k})$;

deciding, according to said criterion C', on the belonging of the image $I_{t-2k}$ to an abrupt transition; and outputting an indication whether the image $I_{t-2k}$ belongs to the abrupt transition.

15. The storage device of claim 14 and further comprising stored program code instructions for executing the following steps when said program is run on the computer:

coding a video sequence, which includes a phase of detecting transitions in said video sequence according to the program code instructions of claim 14.

16. A device for detecting transitions in a video sequence, the device comprising:

means for calculating a first distance $D(I_{t-k})$, between an image $I_{t-k}$ and a reference image for said image $I_{t-k}$, which precedes said image $I_{t-k}$ in the video sequence;

means for calculating a second distance $D(I_{t-2k})$, between an image $I_{t-2k}$ and a reference image for said image $I_{t-2k}$, which precedes said image $I_{t-2k}$ in the video sequence;

means for calculating a third distance $D(I_{t-3k})$, between an image $I_{t-3k}$ and a reference image for said image $I_{t-3k}$, which precedes said image $I_{t-3k}$ in the video sequence;

means for calculating a criterion C' indicating whether said second distance $D(I_{t-2k})$ is significantly greater than the largest of the first and third distances, $D(I_{t-k})$ and $D(I_{t-3k})$; and means for deciding, according to said criterion C', on the belonging of the image $I_{t-2k}$ to an abrupt transition.

17. A coding device of the type including a video encoder and a transition detection device according to claim 16, said transition detection device cooperating with said video encoder or being at least partially included in said video encoder.

* * * * *